Nov. 16, 1937. P. A. CHAMBERLAIN 2,099,050
SPEED CONTROL MECHANISM
Filed June 19, 1934  2 Sheets—Sheet 2
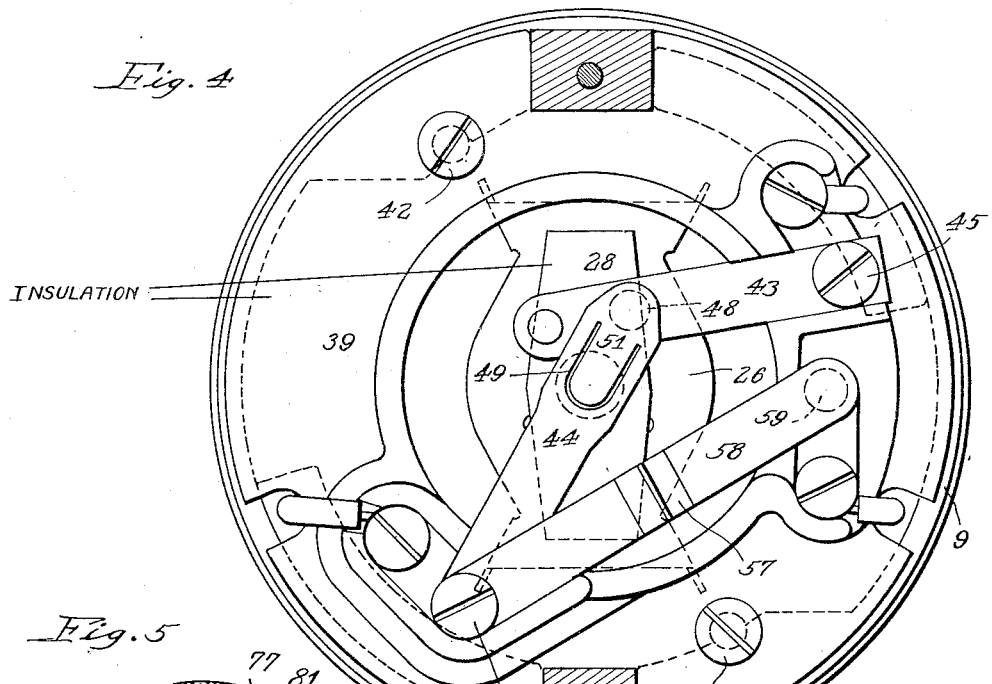
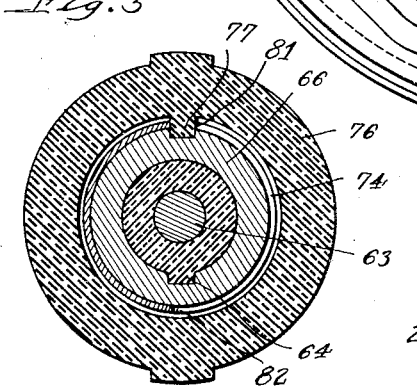
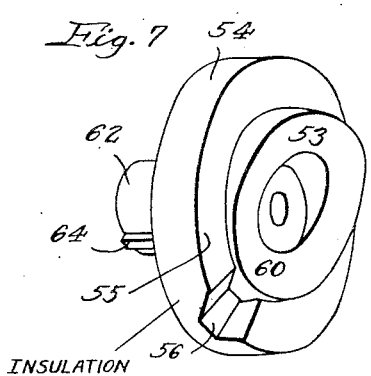
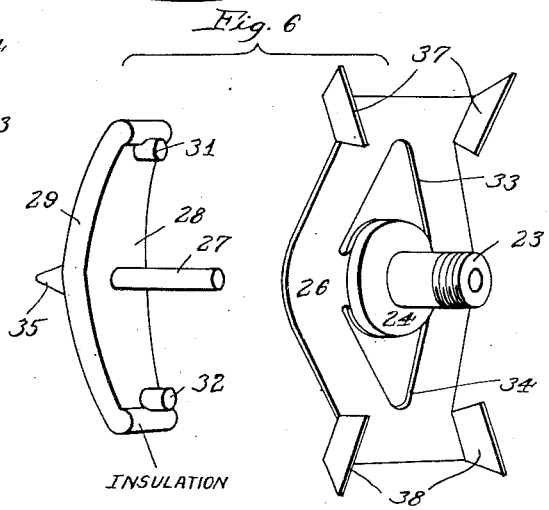
Inventor:
Paul A. Chamberlain Patented Nov. 16, 1937

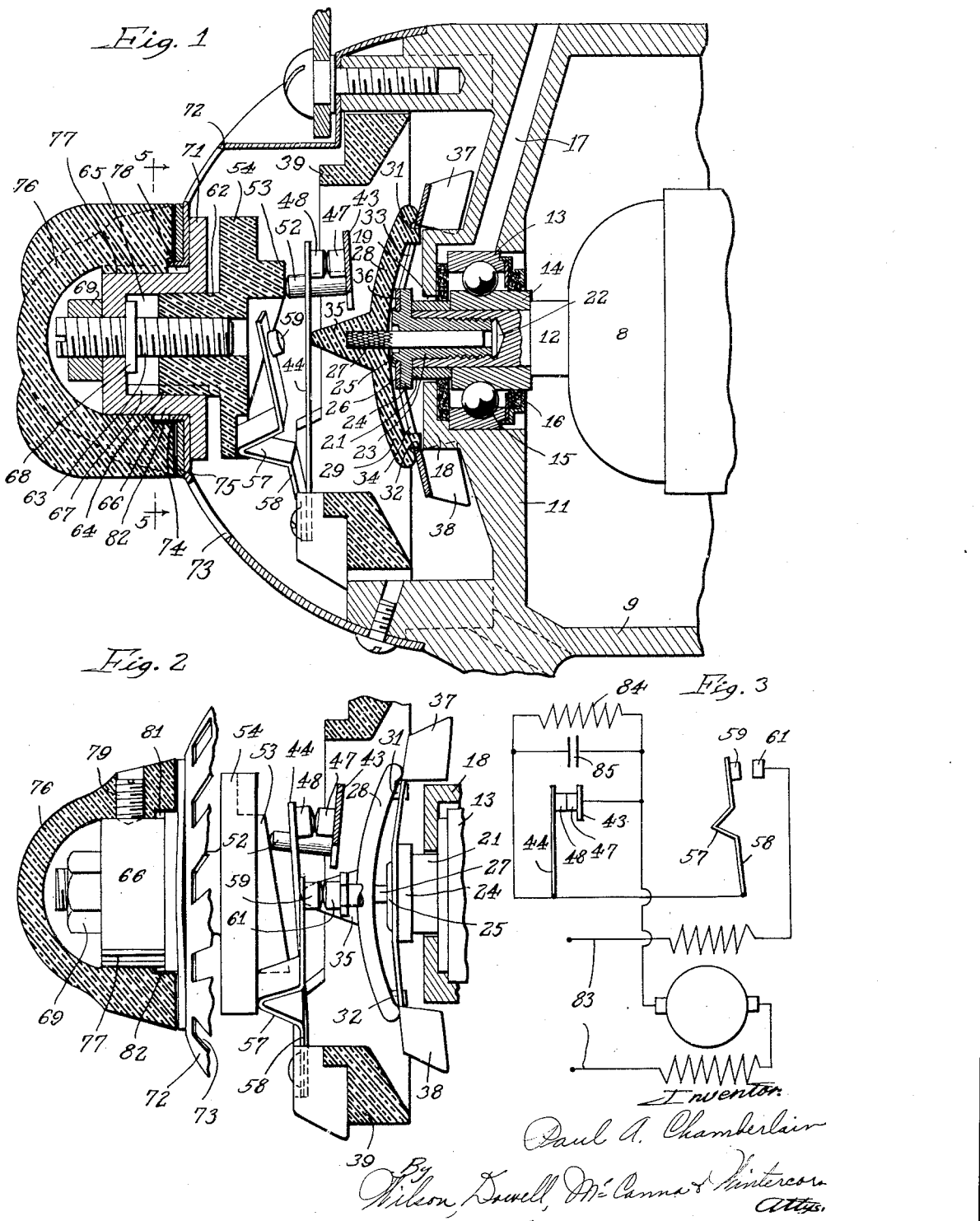

2,099,050

UNITED STATES PATENT OFFICE 2,099,050

SPEED CONTROL MECHANISM

Paul A. Chamberlain, Chicago, Ill., assignor to Chicago Flexible Shaft Company, Chicago, Ill., a corporation of Illinois Application June 19, 1934, Serial No. 731,317

12 Claims. (Cl. 171—222)

This invention relates to switch and variable speed control mechanism for electric motors.

An object of the invention is to provide speed control mechanism of the breaker type wherein the drag on the motor occasioned by contact between the movable and stationary parts of the control mechanism is reduced to a minimum through the provision of point contact between the movable and the stationary parts of the control.

Another object of the invention is the provision of an improved centrifugal member.

A still further object is the provision of a control having breaker points carried on stationary portions of the motor, and improved means for transmitting the effective motion of a centifugal member thereto.

I have also aimed to provide improved means for adjusting the position of the breaker points.

Another aim of the invention is to provide combined switch and speed control mechanism having a manual control member adapted to close a switch upon initial movement thereof and upon continued movement to predetermine the position of the pair of contact points, one of which has its position adjusted in response to the speed of the motor, whereby to open and close the circuit through the motor depending upon the speed thereof.

Other objects and attendant advantages will appear from the following description and the accompanying drawings, in which—

Figure 1 is a section through one end of a motor and motor casing embodying my invention;

Fig. 2 is a fragmentary section similar to Figure 1 showing the parts in moved positions;

Fig. 3 is a wiring diagram suitable for use with my invention;

Fig. 4 is a face view of the control mechanism with the cover and actuating mechanism removed;

Fig. 5 is a section on the line 5—5 of Figure 1;

Fig. 6 is a perspective of the centrifugal member and associated part, and

Fig. 7 is a perspective of the actuating cam.

While the invention may take many different modifications, I have herein shown it is applied to an electric motor having an armature 8 and a casing 9, the casing having a partition 11 at its end. The armature shaft 12 extends through partition 11 and is supported therein by means of a bearing including ball races 13 and 14 and ball bearings 15 the lubricant being retained in the bearing through a conventional form of packing 16. An oil tube 17 serves to conduct lubricant to the bearing. The rear face of the partition 11 has a boss 18 provided with an opening 19 through which the end of the armture shaft 12 passes, the shaft being surrounded by a bushing 21. The end of the armature shaft is bored as shown at 22 for the reception of a screw 23 which is threaded therein to rotate with the armature shaft. The screw 23 has a flat head 24 provided with a flange 25 adapted to be riveted over to secure a centrifugal governor member designated generally by the numeral 26 against the head 24 so that the governor member rotates with the armature shaft. The screw 23 has a bore for the reception of a pin 27 affixed in a translating member 28 of insulating material, the pin having longitudinal movement with respect to the screw. The translating member, best shown in Figures 1 and 6, consists of an arcuate body portion 29 adapted to lie against the surface of the governor member 26 and having projections 31 and 32 for reception in slots 33 and 34 of the governor member to normally present rotation of the translating member independent of the governor member. The center of the translating member is projected with an outwardly extending tit 35 arranged to bear against a contact holder presently to be more fully described.

Referring again to the governor member, this may advantageously consist of an arcurately shaped sheet metal part having a curvature such as shown in Figure 1 and provided with a central portion 36 for attachment to the screw 23. The outer ends of the governor member may be convieniently provided with wings 37 and 38 as shown in Fig. 6 which serve as weights and also act as fan blades to propel the air through the motor casing. Upon rotation of the armature shaft 12 the governor member tends to become coplanar, the ends of the governor member moving toward the plane of the central portion 36. As this movement occurs, it is transmitted to the translation member 29 which in turn moves outward in a direction away from the partition 11 causing the tit 35 to also move outward for a purpose which will presently appear.

A ring of insulating material 39 is secured against the back end of the casing by means of screws 41 and 42, and a pair of contact carriers 43 and 44 of strip spring metal is attached thereto by means of screws 45 and 46 (Fig. 4) and carry opposed contact points 47 and 48 (Figures 1 and 2). The carrier 44 is cut away as shown at 49 to provide a finger 51 which is in effect an extension of the length of the carrier 44 and serves for contact of the tit 35 to regulate the position of the contact point 48. The carrier 43 has a pin 52 thereon projecting rearwardly for contact with a cam face 53 of a cam member 54 (Figures 1 and 7) which serves upon rotation to adjust the position of the contact point 47. The cam member is of insulating material and the cam face 53 is shaped to progressively move the contact carrier 43 and contact point 47 toward and away from the translating member 28. The cam member also has a cam surface 55 provided with a notch 56 arranged to receive a projection 57 on a switch element 58 secured to the insulating ring 39 by means of the screw 46 and carrying a contact point 59 for cooperation with a contact point 61 on the insulating member 39 to close the electric circuit through the motor, as will presently be described. Thus, when the cam member 54 is rotated, the projection 57 rides out of the notch 56 closing the contact points 59 and 61 upon the initial movement of the cam member. Continued rotation of the cam member causes the pin 52 to ride up the cam surface 53 to adjust the position of the contact point 47. The contact carrier members 43 and 44 are so arranged that in the top speed position of the cam member 54, when the pin 52 rests against the flattened portion 60 of the cam 53, the carrier 43 urges the contact point 47 against the contact point 48 causing the carrier 44 to bend outwardly as shown in Fig. 2. In this way the carrier 44 occupies a position such that the tit 35 will not bear against the finger 51 when the speed of the motor is such that the ends of the centrifugal member 26 are substantially coplanar with the hub 36 thereof. This represents the maximum speed of the motor. As the cam member is rotated to the position shown in Figure 1, the carrier 43 is moved toward the translation member 28 allowing the carrier 44 to move into the position shown in Figure 1 in which only slight lateral movement of the centrifugal member 26 will cause the tit 35 to contact the finger 51 and separate the contact points, which is the low speed setting of the control. Between these points the speed of the motor is variable.

The cam member 54 has a hub 62 bored to receive a threaded pin 63 and having a key 64, the hub 62 being received in a socket 65 of a retainer member 66 and the key 64 being received in a keyway 67 of the retainer member. The cam member is retained in the retainer member between spaced nuts 68 and 69. The retainer member has a flange 71 adapted to bear against the inner side of a shell 72 which encloses the switch and speed control mechanism. The shell 72 has ventilating openings 73 for the reception of air which is drawn in through these openings by rotation of the governor member and is circulated through air passages in the partition 11, across the motor, and is discharged through openings near the front of the casing. The shell 72 has a centrally disposed opening provided with a flange 74 for the reception of the body of the retainer member and to provide bearing surface therefor. A spring ring 75 is positioned against the outer surface of the shell 72. A knob 76 receives the end of the retainer member 66 which projects through the shell and has a key 77 received in a keyway 78 on the retainer member, the knob being secured to the retainer member by means of screws 79 or in any suitable way and serving as a hand hold for manual rotation of the retainer member 66 and the cam member 54. The flange 74 surrounding the centrally disposed opening in the shell 72, is slotted out through substantially half of its circumference to provide opposed abutments as shown at 81 and 82 for contact with the key 77 to limit the rotation of the knob and consequently of the cam member 54 to substantially one-half of a complete revolution.

Referring now to the wiring diagram in Fig. 3, when the knob 76 is rotated so as to close the contact points 59 and 61, current flows through leads 83 supplying current to the motor through the motor windings, the contact points 59 and 61 and the contact points 47 and 48 causing the motor to operate. However, when the motor reaches a speed such that the ends of the centrifugal member 26 move outward and urge the tit 35 against the spring carrier 44, the contact points 47 and 48 are separated, causing the speed of the motor to decrease. When the contact points 47 and 48 are separated, a small amount of current still flows through the motor by means of a resistance coil 84 and condenser 85 which may be sufficient to maintain a predetermined minimum speed on the motor. The amount of this resistance is a compromise between the lowest speed of the motor and the amount of arcing at the contact points. It should be as small as possible commensurate with proper reduction in arcing. As the knob 76 is rotated causing the pin 52 to move up the cam surface 53, increasing speed of the motor will be required before the centrifugal member will cause the contact points 47 and 48 to be opened. However, when the contact points 47 and 48 are opened under the influence of the centrifugal member, the direct supply of current is cut off from the motor and the motor speed decreases, causing the points to again come into contact thereby again increasing the speed of the motor. The purpose of the coil 84 is to save, insofar as possible, arcing at the breaker points 47 and 48 by conducting as much as possible of the current through this coil. The condenser 85 serves to further reduce arcing at the contact points and thereby prolong their effective life.

Attention is directed to the fact that the current is carried entirely through breaker mechanism located on the stationary parts of the motor and that at no time is current conducted through any part of the control mechanism carried on the armature or shaft of the motor. Through this arrangement the use of brushes and similar mechanism is entirely eliminated and only point contact is had between the moving and the stationary parts of the control mechanism and, when the motor is operating slightly under its control speed, in other words, during a portion of the time there is no contact whatever between the moving and the stationary parts of the control mechanism. This largely eliminates the drag occasioned in prior constructions in which the breaker points were carried on parts rotatable with the armature shaft under which circumstances it was necessary to conduct current to and from the movable portion of the control mechanism.

It will further be seen that I have provided improved means for adjusting the speed of the motor by means of a knob carrying a cam, which cam acts upon the breaker points to adjust their position toward and away from the centrifugal portion of the control mechanism. This provides a simple and inexpensive means for bringing about the adjustment and permits of combining therewith switch means for controlling the power inlet. I have also provided an improved centrifugal member formed entirely of sheet metal and where the weights are in the form of wings or impeller blades which serve to distribute air through the motor and control mechanism.

While I have described my invention in connection with a particular illustration thereof, I am aware that numerous alterations and changes may be made therein without departing from the spirit of the invention and I do not wish to be limited except as required by the prior art and the scope of the appended claims, in which—

I claim:

1. The combination in speed control mechanism for electric motors, of speed control mechanism comprising a centrifugal member carried on the motor shaft, a pair of contact points for closing the circuit through the motor, a ring of insulation material secured annularly on said motor, contact springs secured to said ring and lying wholly in spaced planes for carrying the contact points, one of the springs having greater tension than the other whereby to normally maintain the contact points closed upon adjustment of the first mentioned spring, means for translating lateral motion of the centrifugal member along the axis of rotation to the spring of lesser tension, and manually operable means acting on said spring of greater tension at a point remote from the axis of rotation for predetermining the position of the spring of greater tension whereby to predetermine the motor speed at which the contact points will be opened.

2. The combination in speed control mechanism for electric motors, of a variable speed control mechanism comprising a sheet metal centrifugal member carried on the motor shaft and extending transversely thereof, an arcuate translation member on the shaft arranged to be moved longitudinally thereof by contact of the ends of the arcuate member with the centrifugal member at points remote from the axis thereof, means on a stationary part of the motor positioned for engagement by said translation member to open the circuit through the motor, and means to adjust the position of said last mentioned means to predetermine the operating speed of the motor.

3. A combination as recited in claim 2 wherein the centrifugal member includes a plurality of wings serving as weights for actuation of the centrifugal member and as blades to circulate air through the motor.

4. The combination in speed control mechanism for electric motors, of a variable speed control mechanism comprising a centrifugal member on the motor shaft, a translation member of insulating material on the shaft arranged to be moved longitudinally thereof by the centrifugal member and having a pointed portion coaxial with the shaft, a pair of breaker points on a stationary part of the motor for controlling the circuit through the motor, means for carrying one of said breaker points positioned to be engaged by said pointed portion to separate said breaker points, and means for supporting the other of said points for manual adjustment with relation to said pointed portion to predetermine the speed of the motor.

5. The combination in speed control mechanism for electric motors, of variable speed control mechanism comprising an arcuate sheet metal centrifugal member having a central portion attached to the shaft of the motor and carrying wings at its extremities, a translation member of insulating material slidably supported on said shaft and adapted to bear against the extremities of said centrifugal member, a translation member having a centrally disposed pointed portion, a pair of contact springs carried on a stationary part of the motor and insulated therefrom, opposed breaker points on said contact springs for controlling the supply of current to the motor, one of said springs being positioned for engagement by said pointed portion for movement of the breaker point thereon to open the circuit, and cam means for moving the other contact spring to predetermine the distance between said springs and said pointed portion to predetermine the motor speed.

6. The combination in speed control mechanism for electric motors, of a pair of breaker points supported on a stationary part of the motor for supplying current to the motor, means on the motor shaft for opening and closing said breaker points to maintain a predetermined motor speed, a switch lever adapted to close the circuit through the motor, and a manually operable cam shaped to actuate said switch lever upon initial movement and, upon continued movement thereof, to move said breaker points to predetermine the speed of the motor.

7. The combination in a speed control mechanism of a driven shaft, a pair of electrical contacts relatively movable to open and close a circuit to control the speed of the shaft and centrifugal means on the shaft for moving said contacts comprising an arcuate sheet metal centrifugal member having a central portion attached to the shaft of the motor and carrying wings at its extremities acting as weight members and as air impellers, and a translation member of insulating material slidably supported on said shaft and adapted to bear against the extremities of said centrifugal member, said translation member having a pointed portion disposed on the axis of rotation to impart said movement to the contacts.

8. The combination in a speed control mechanism of a driven shaft, a pair of electrical contacts relatively movable to control the speed of the shaft and centrifugal means on the shaft for moving said contacts comprising an arcuate sheet metal centrifugal member having a central portion attached to the shaft, and wings at its extremities to act as weight members and as air impellers, and an arcuate translation member slidably supported at its center on said shaft and having outwardly extending opposed arms for engagement with said centrifugal member at spaced points adjacent the extremities thereof, said translation member and said centrifugal member having complemental means at said spaced point for mutual engagement, said translation member having a pointed portion on the axis of rotation to impart said movement to the contacts.

9. The combination in a speed control mechanism of a driven shaft, a pair of electrical contacts relatively movable to control the speed of the shaft and centrifugal means on the shaft for moving said contacts comprising an arcuate sheet metal centrifugal member having a central portion attached to the shaft of the motor, and wings at is extremities acting as weight members and as air impellers, and a translation member of insulating material adapted to bear against the extremities of said centrifugal member, said translation member having a bearing portion centrally disposed thereon and receivable in the end of said shaft to support the translation member for movement longitudinally of the shaft, said translation member also having a pointed portion disposed on the axis of rotation for imparting said movement to the contacts.

10. The combination in a combined motor and speed control mechanism of a motor having a casing provided with ventilation openings, a pair of electrical contacts relatively movable to open and close a circuit to control the speed of the motor, means carried on the shaft of the motor for imparting relative movement to said contacts, said means being arranged to produce a flow of air through said motor casing, and manually operable means for moving said contacts to adjust the speed of the motor.

11. The combination in a combined motor and speed control of a motor having a casing enclosing the same and a transverse partition adjacent one end, a motor armature shaft carried by said partition, a pair of contacts, spring means carried on said casing on the side of said partition opposite said motor for supporting said contacts, centrifugal means on the outer side of said partition operative on the axis of rotation of said shaft for moving one of said supporting means and its associated contact, enclosing means for said contacts, said spring means, and said centrifugal means, said enclosing means covering the end of said casing, an insulation member mounted in said enclosing means for manual rotation on the axis of rotation of said shaft, said member having a cam face helically disposed with respect to the axis of rotation and remote therefrom, said cam face being operative on the other of said spring means to position the other of said contacts and thereby regulate the speed of the motor.

12. The combination in a combined motor and speed control therefor of a motor having a casing, a pair of electrical contacts and spring means for carrying the same within said casing, centrifugal means operative on the axis of rotation for moving one of said supporting means and the associated contact, a switch positioned within the casing, and an insulation member mounted for manual rotation on the axis of rotation of said motor, said member having a cam face helically disposed with respect to the axis of rotation and remote therefrom, said cam face being operative on the other of said spring means to position the other of said contacts and thereby regulate the speed of the shaft and having a second cam face on a radius more remote than the first mentioned cam face for the purpose of operating said switch upon rotation of the insulation member.

PAUL A. CHAMBERLAIN.